(12) United States Patent
Hayakawa et al.

(10) Patent No.: US 8,857,217 B2
(45) Date of Patent: Oct. 14, 2014

(54) MOLD AND GLASS MOLDED BODY MANUFACTURING METHOD

(75) Inventors: Shuhei Hayakawa, Hachioji (JP); Kazunari Tada, Marugame (JP)

(73) Assignee: Konica Minolta, Inc., Tokyo (JP)

( * ) Notice: Subject to any disclaimer, the term of this patent is extended or adjusted under 35 U.S.C. 154(b) by 585 days.

(21) Appl. No.: 13/139,950

(22) PCT Filed: Dec. 8, 2009

(86) PCT No.: PCT/JP2009/070531
§ 371 (c)(1),
(2), (4) Date: Jun. 15, 2011

(87) PCT Pub. No.: WO2010/071050
PCT Pub. Date: Jun. 24, 2010

(65) Prior Publication Data
US 2011/0247365 A1    Oct. 13, 2011

(30) Foreign Application Priority Data
Dec. 18, 2008    (JP) .................. 2008-321924

(51) Int. Cl.
*C03B 11/06* (2006.01)
*C03B 11/08* (2006.01)

(52) U.S. Cl.
CPC .......... *C03B 11/086* (2013.01); *C03B 2215/03* (2013.01); *C03B 2215/16* (2013.01); *C03B 2215/12* (2013.01); *C03B 2215/22* (2013.01); *C03B 2215/20* (2013.01); *C03B 2215/65* (2013.01); *C03B 2215/11* (2013.01); *C03B 2215/17* (2013.01)

USPC .................. 65/206; 65/223; 65/305

(58) Field of Classification Search
USPC .............. 65/66, 305–322, 226, 223, 102, 65/374.1–374.15
See application file for complete search history.

(56) References Cited

U.S. PATENT DOCUMENTS 5,223,350 A    6/1993    Kobayashi et al.
5,500,079 A *  3/1996    Nishizawa et al. ........... 438/708
(Continued)

FOREIGN PATENT DOCUMENTS

JP    3-83824    4/1991
JP    3-137031    6/1991
(Continued)

OTHER PUBLICATIONS

JP 03-137031 (abstract) [online], [retrieved on Nov. 14, 2013].*
(Continued)

*Primary Examiner* — Richard Crispino
*Assistant Examiner* — Yana B Krinker
(74) *Attorney, Agent, or Firm* — Lucas & Mercanti, LLP

(57) ABSTRACT

Disclosed is a mold used as a bottom mold for manufacturing glass molded bodies by accepting molten glass droplets that are dripped in and by compression molding of the molten glass droplets in conjunction with a top mold. The mold is provided with a base material that has a mold surface for compression molding of molten glass drops, and a coating layer formed on the mold surface. The surface of the coating layer formed on the mold surface has a rough surface region that comprises the center of the mold surface, and a mirror finished region that surrounds the outside of the rough surface region and has a lower arithmetic mean roughness Ra than the rough surface region.

14 Claims, 6 Drawing Sheets

(56) References Cited

U.S. PATENT DOCUMENTS

| | | | |
|---|---|---|---|
| 5,662,999 A * | 9/1997 | Taniguchi et al. | 428/408 |
| 2004/0196567 A1 * | 10/2004 | Hosoe | 359/642 |
| 2006/0130522 A1 * | 6/2006 | Fukumoto et al. | 65/24 |

FOREIGN PATENT DOCUMENTS

| | | | | |
|---|---|---|---|---|
| JP | 03-137031 | * | 11/1991 | C03B 11/00 |
| JP | 5-178628 | | 7/1993 | |
| JP | 8-133762 | | 5/1996 | |
| JP | 2005-272187 | | 10/2005 | |
| JP | 2006-206423 | | 8/2006 | |
| WO | WO 03090993 | * | 6/2003 | B29C 39/10 |

OTHER PUBLICATIONS

WO 03090993 (abstract) [online], [retrieved on Nov. 14, 2013].*
English-language International Search Report from the Japanese Patent Office mailed Mar. 2, 2010, for International Application No. PCT/JP2009/070531.

* cited by examiner

FIG. 3a
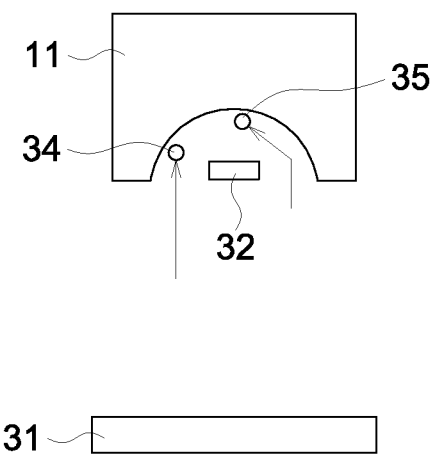
FIG. 3b
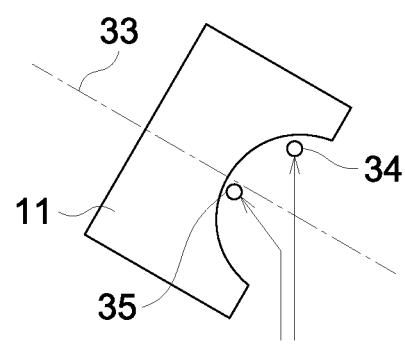
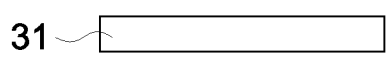

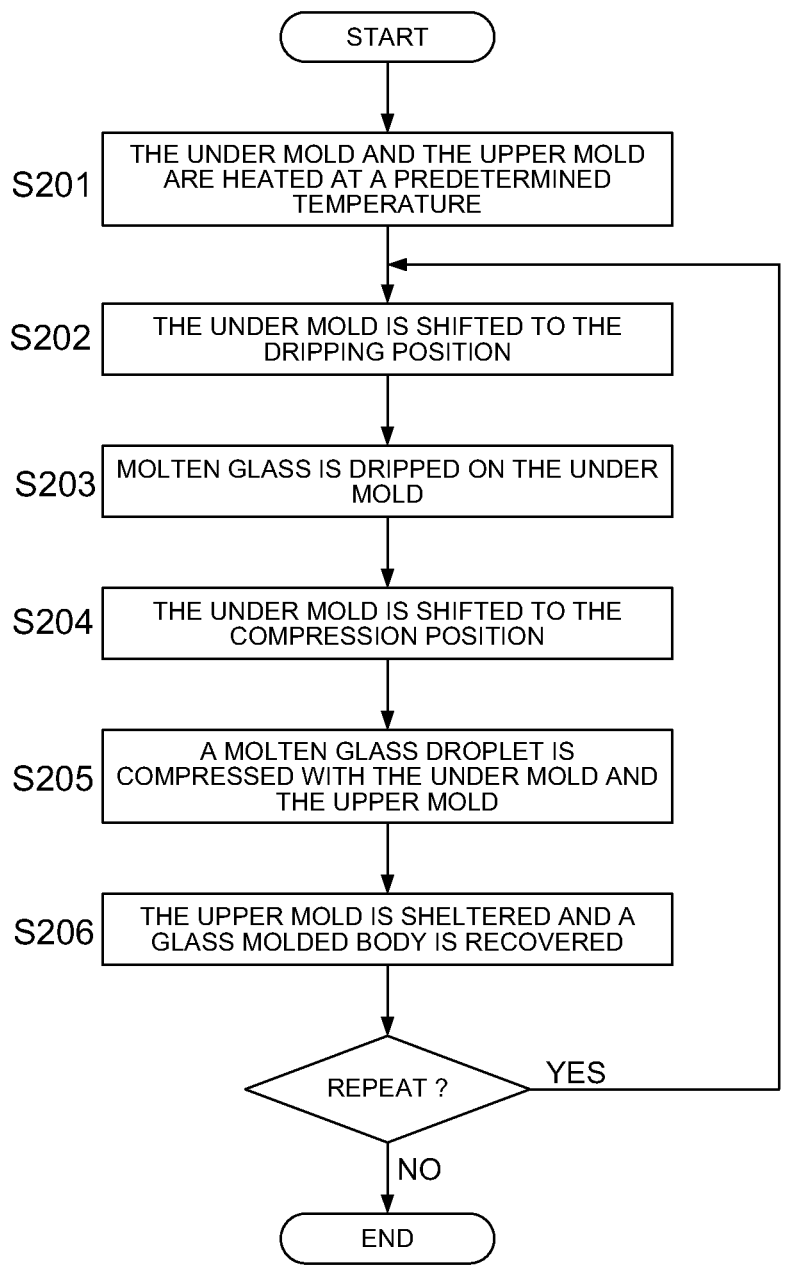

MOLD AND GLASS MOLDED BODY MANUFACTURING METHOD

CROSS REFERENCE TO RELATED APPLICATIONS

This application is a national phase application based on International Application No. PCT/JP2009/070531, filed Dec. 8, 2009, which claims the priority of Japanese Patent Application No. 2008-321924, filed Dec. 18, 2008, the content of both of which is incorporated herein by reference.

FIELD OF THE INVENTION

The present invention relates to a mold for manufacturing a glass molded body by press-molding molten glass droplet and a method for manufacturing a glass molded body utilizing said mold.

BACKGROUND OF THE INVENTION

In recent years, an optical element made of glass is utilized in a wide range of applications such as a lens for a digital camera, an optical pickup lens for an optical disc, a camera lens for a cell phone and a coupling lens for optical communication. As such an optical element made of glass, a molded glass body manufactured by press-molding a glass material by use of a mold has come to be generally utilized.

As such a manufacturing method of molded glass bodies, proposed is a method in which molten glass droplets are dropped on an under mold and the dropped molten glass droplets are subjected to press-molding with the under mold and an upper mold facing to the under mold to prepare molded glass bodies (hereinafter, referred to as "a liquid droplet molding method"). This method has been noted because time necessary for one shot of molding can be made very short since it is possible to manufacture a molded glass body directly from a molten glass droplet without repeating heating and cooling of the molds.

However, in this liquid droplet molding method, a minute concave part is formed in the central neighborhood of the bottom surface of a molten glass droplet (the contact surface with an under mold) due to collision at the time of dripping a molten glass droplet on an under mold. Since air getting in this concave part has no escaping place to be kept sealed until a molten glass droplet is cooled and solidified, there was a problem of an air pool remaining on the bottom surface of a glass molded body manufactured.

To solve this problem, proposed is a method in which the surface of an under mold is made to have $R_{max}$ of 0.05-0.2 μm and secure a flow path of air having got in a concave part to prevent an air pool from remaining (refer to patent document 1). Further, proposed is an under mold which prevents an air pool as well as makes easy reproduction by forming a cover layer on the surface of an under layer having Ra of 0.005-0.05 μm (refer to patent document 2).

PRIOR TECHNICAL DOCUMENTS

Patent Documents

Patent document 1: JP-A 3-137031 (hereinafter, JP-A refers to Japanese Patent Publication Open to Public Inspection No.)
Patent document 2: JP-A 2005-272187

SUMMARY OF THE INVENTION

Problems to be Solved by the Present Invention

However, as for an under mold described in patent document 1, there was a problem that molten glass often tightly adheres (fuses) to an under mold since a base material of an under mold is exposed out of the surface to be made directly contact with molten glass to cause an easy reaction between molten glass and an under mold.

Further, as for an under mold described in patent document 2, since the whole surface of a cover layer is provided with roughness and strength of a cover layer will be lowered due to formation of roughness, there was a problem of causing peeling and cracking of a cover layer at the peripheral portion which receives the maximum load at the time of press-molding resulting in easy breakage of a mold.

This invention has been made in view of the above-described technical problems and the object of this invention is to provide a mold which can prevent generation of fusing with molten glass and generation an air pool as well as can restrain breakage due to strength decrease of the peripheral portion.

Means to Solve the Problems

To solve the problems described above, this invention is characterized by the followings.

1. A mold which is utilized as an under mold for manufacturing glass molded bodies by receiving dropped molten glass droplets and by press-molding in conjunction with an upper mold, wherein the mold is provided with a base material having a molding surface to perform press-molding of the molten glass droplets and a cover layer formed on the molding surface, and the surface of the cover layer formed on the molding surface is provided with a roughened surface region including the center portion of the molding surface and a mirror finished region surrounding the outside of the roughened surface region and having arithmetic average roughness Ra of not more than that of the roughened surface region.

2. The mold described in aforesaid item 1, wherein the surface of the cover layer in the aforesaid roughened surface region has arithmetic average roughness Ra of 0.01-0.5 μm and mean length of a roughness curve element RSm of not more than 0.5 μm, and wherein the surface of the cover layer in the aforesaid mirror finished region has arithmetic average roughness Ra of less than 0.01 μm.

3. The mold described in aforesaid item 1 or 2, wherein the roughened surface region is formed by providing the cover layer formed on the base material with a roughening treatment to increase arithmetic average roughness Ra.

4. The mold described in aforesaid item 3, wherein the roughening treatment is a treatment to etch the cover layer and etching rates at the time of etching are different between the roughened surface region and the mirror finished region.

5. The mold described in aforesaid item 3 or 4, wherein the cover layer contains at least one kind of metal elements in a group comprising aluminum, titanium and chromium, at least one kind of oxides of the metal elements or at least one kind of nitrides of the metal elements as a primary component.

6. The mold described in any one of aforesaid items 3-5, wherein the film thickness of the cover layer is not less than 0.5 μm and not more than 10 μm.

7. The mold described in aforesaid item 1 or 2, wherein the roughened surface region is comprised of the cover layer formed on the base material provided with a roughening treatment to increase arithmetic average roughness Ra.

8. The mold described in aforesaid item 7, wherein the cover layer contains at least one kind of metal elements in a group comprising aluminum, titanium and chromium, at least one kind of oxides of the metal elements or at least one kind of nitrides of the metal elements as a primary component.

9. The mold described in aforesaid item 7, wherein the cover layer contains at least one kind of metals in a group comprising ruthenium, rhodium, palladium, silver, tungsten, osmium, iridium and platinum as a primary component.

10. The mold described in any one of aforesaid items 7-9, wherein the film thickness of the cover layer is not less than 0.01 μm and not more than 10 μm.

11. The mold described in any one of aforesaid items 1-10, wherein arithmetic average roughness Ra continuously varies at the boundary portion between the roughened surface region and the mirror finished region.

12. The mold described in any one of aforesaid items 1-11, wherein the boundary between the roughened and the mirror finished region is outside of a circle provided with the center of the molding surface as a center and a diameter of 0.1 mm.

13. The mold described in any one of aforesaid items 1-12, wherein the molding surface has a concave surface having an angle against the horizontal surface of not less than 30° and the region having an angle against the horizontal surface of not less than 30° within the molding surface is the mirror finished region.

14. A method for manufacturing glass molded bodies which includes a step of dropping a molten glass droplet on an under mold and a step of subjecting the molten glass droplets dropped on the under mold with press-molding by use of the under mold and an upper mold opposing to the under mold, wherein the under mold is a mold described in any one of aforesaid items 1-13.

Effects of the Invention

According to this invention, it is possible to restrain generation of fusing of a mold with molten glass since a cover layer is formed on the molding surface of the mold. Further, generation of an air pool can be restrained because a roughened surface region is formed at the central position of a molding surface. In addition, on the peripheral portion which accepts the maximum load at the time of press-molding, a mirror finished region having arithmetic average roughness Ra not more than that of a roughened surface region is formed. Since the strength of a cover layer in a mirror finished region is higher than that in a roughened surface region, it is possible to restrain breakage due to strength decrease of the peripheral portion. Therefore, according to this invention, it is possible to restrain generation of fusing of a mold with molten glass and generation of an air pool as well as to restrain breakage due to strength decrease of the peripheral portion.

BRIEF DESCRIPTION OF THE DRAWINGS

FIG. 3 is a drawing to schematically show an example of a method for deposition of a cover layer by means of a spattering method.

FIG. 4 is a flow chart to show an example of a manufacturing method of a glass molded body.

DETAILED DESCRIPTION OF THE INVENTION

In the following, an embodiment of this invention will be explained in reference to FIGS. 1-6; however, this invention is not limited by said embodiment.

(Mold)

Figure 1A:
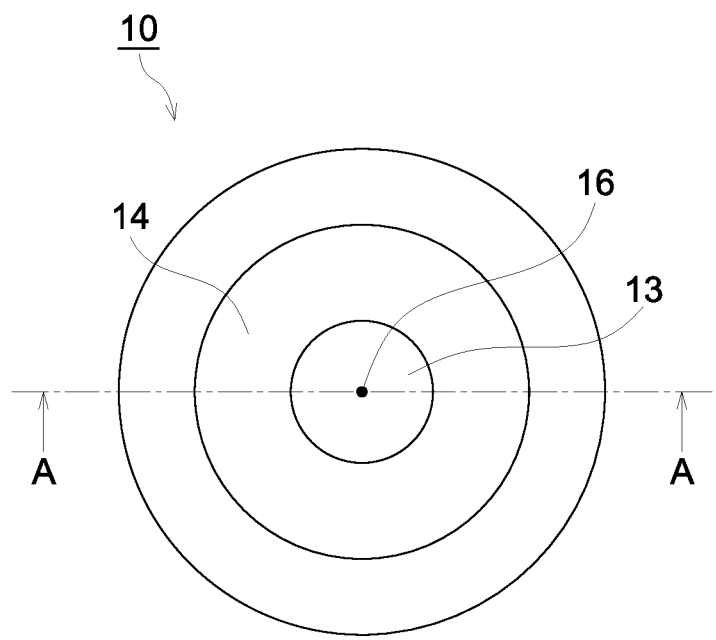
FIG. 1 is a drawing to schematically show a mold of this embodiment.
Figure 1B:
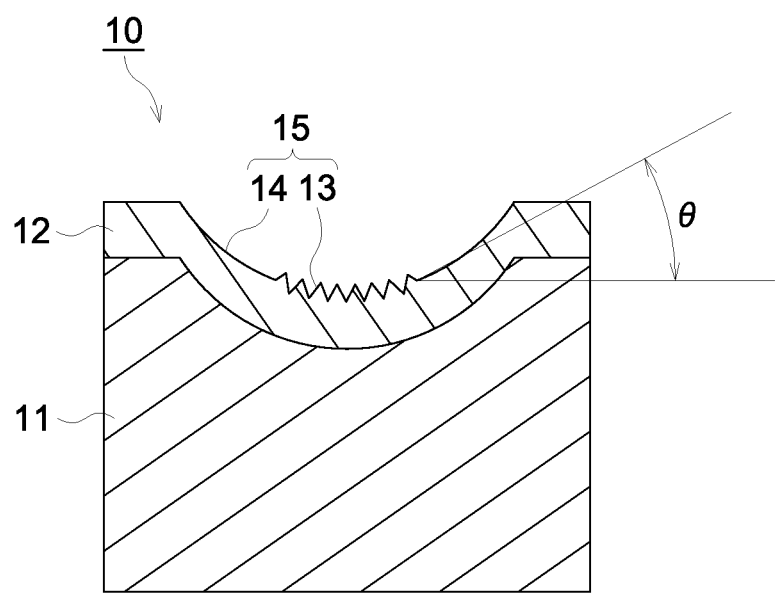

First, mold 10 according to this embodiment will be explained in reference to FIGS. 1-3. FIG. 1 is a drawing to schematically show mold 10 according to this embodiment. FIG. 1 (*a*) is an over view of mold 10 observed from the molding surface 15 side, and FIG. 1 (*b*) is a cross-sectional view at A-A of FIG. 1 (*a*). Mold 10 is utilized as an under mold for manufacturing glass molded bodies by receiving molten glass droplets dropped and by press-molding of molten glass droplets in conjunction with an upper mold. The mold is provided with base material 11 which has molding surface 15 for press-molding and cover layer 12 formed on molding surface 15. Further, the surface of cover layer 12 formed on molding surface 15 is provided with roughened surface region 13 including central portion 16 of molding surface 15 and mirror finished region 14 which surrounds the outside of roughened surface region 13 and has arithmetic average roughness Ra of not larger than that of roughened surface region 13.

Molding surface 15 is provided with a predetermined shape corresponding to the shape of a glass molded body to be manufactured. The shape of molding surface 15 is preferably provided with a concave surface capable of stably receiving molten glass droplets, however, is not limited thereto and may be provided with a flat surface or a convex surface. Further, the material of base material 11 is not specifically limited and may be appropriately selected among materials well known in the art suitable for a mold. Preferable materials include such as various kinds of heat resistant alloys, super-hard materials, ceramics and cermets. Among them, preferable are materials containing at least one kind among a group including tungsten carbide, silicon carbide, silicon nitride, cermets, stainless steel, silicon, alumina and zirconia a as a primary component.

Molding surface 15 is provided with cover layer 12. Thereby, molten glass and base material 11 never directly contact with each other to prevent molten glass from tightly adhering (fusing) to mold 10. The material of cover layer 12 may be one hardly react with molten glass and various kinds of metals, nitrides and oxides can be utilized.

Among them, the material preferably contains at least one of metal elements in a group comprising aluminum, titanium and chromium, at least one kind of oxides of said metal elements (aluminum oxide, titanium oxide or chromium oxide), or at least one kind of nitrides of said metal elements (chromium nitride, aluminum nitride or titanium nitride) as a primary component. Film comprising such a material as a primary component is characterized in that the surface is oxidized by heating in the air to form a stable oxide layer on the outermost surface. Since any oxide of chromium, aluminum or titanium has a small standard free energy of formation (standard Gibb's energy of formation) and is very stable, it has a merit of hardly reacting even in contact with high temperature molten glass. In addition, it also has a merit of easy deposition and of the surface being easily roughened by etching. Further, cover layer 12 may contain other materials within a range of not disturbing these merits.

Further, cover layer 12 also preferably contains at least one metal among a group comprising ruthenium, rhodium, palladium, silver, tungsten, osmium, iridium and platinum as a primary component. These metal films have a merit of easy deposition and of being very stable against molten glass. Herein, cover layer 12 may contain other materials within a range of not disturbing these merits.

Next, the reason why generation of an air pool and breakage due to strength decrease of the peripheral portion can be restrained by mold 10 will be explained. FIG. 2 is a drawing to show the state of molten glass droplet 20 dropped on mold 10. FIG. 2 (*a*) shows the state of the moment when the bottom portion of molten glass droplet 20 collided on molding surface 15, and FIG. 2 (*b*) shows the state of molten glass droplet 20 being roundly deformed due to surface tension.

Figure 2A:
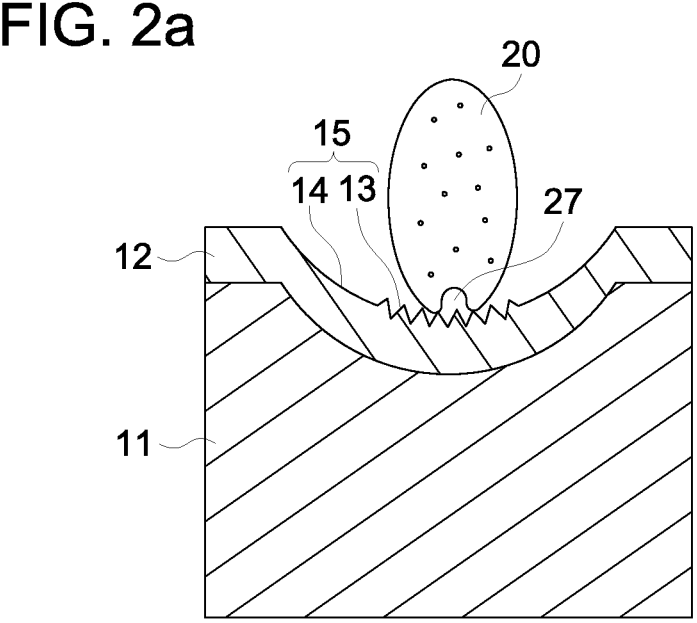
FIG. 2 is a drawing to show a state of a molten glass droplet dropped on a mold.
Figure 2B:
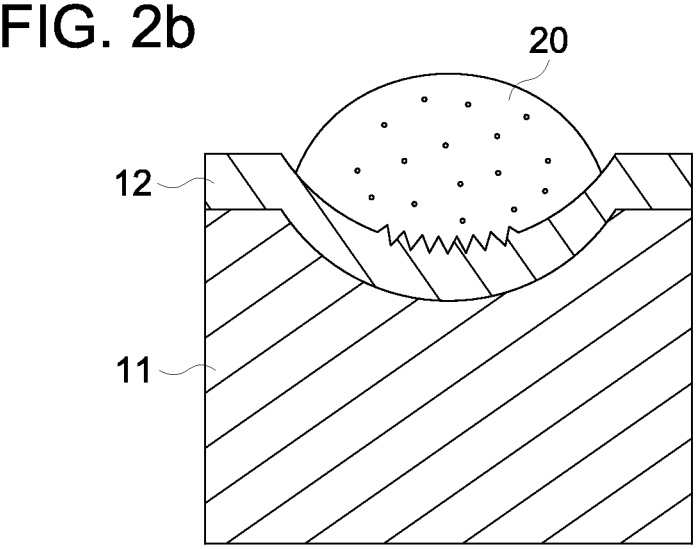

As shown in FIG. 2 (*a*), glass firstly collided against molding surface 15 among molten glass droplet 20 dropped splashes back upward due to reaction resulting in generation of minute concave portion 27 having a diameter of approximately few tens-few hundreds µm in the central neighborhood of the bottom surface of molten glass droplet 20. Molten glass droplet 20, thereafter, as shown in FIG. 2 (*b*), is roundly deformed due to a function of surface tension. At this time, in the case of cover layer 12 without roughened surface region 13, since an escape path for air pooled in concave portion 27 will be lost due to fusion of the bottom surface of molten glass droplet 20 with cover layer 12, concave portion 27 will never be extinguished and remain as an air pool. However, since cover layer 12 of mold 10 according to this embodiment is provided with roughened surface region 13, a gap will remain between the bottom surface of molten glass droplet 20 and cover layer 12. Therefore, at the time when molten glass droplet 20 is roundly deformed due to a function of surface tension, air pooled in concave portion 27 will escape through said gap to extinguish concave portion 27.

To form a gap sufficient for air pooled in concave portion 27 to escape, the surface of cover layer 12 in roughened surface region 13 is provided with arithmetic average roughness Ra of preferably not less than 0.01 µm and of more preferably not less than 0.05 µm. On the other hand, when arithmetic average roughness Ra is excessively large, there may be a case to make the surface roughness of a glass molded body prepared too large although a gap for air to escape is easily secured. Therefore, the surface of cover layer 12 in roughened surface region 13 is preferably provided with arithmetic average roughness Ra of not more than 0.2 µm. Further, when mean length of roughness curve element RSm becomes unnecessarily long, there may be a case that glass easily enters into the bottom of valleys of roughness to hardly form a gap of a sufficient size. Therefore the surface of cover layer 12 in roughened surface region 13 is provided with mean length of a roughness curve element RSm of preferably not more than 0.5 µm and more preferably not more than 0.3 µm.

To restrain generation of air pools, the portion among molding surface 15 against where molten glass droplet 20 firstly collides may be provided with roughened surface region 13, and it is not necessary to make the whole surface of molding surface 15 be roughened surface region 13. Therefore, by making the central portion of molding surface 15 be roughened surface region 13 as well as making the peripheral portion which receives the maximum load at the time of press-molding be mirror finished region 14, it is possible to restrain generation of an air pool and breakage of the peripheral portion due to strength decrease. In view of effectively restraining breakage of the peripheral portion due to strength decrease, the surface of cover layer 12 in mirror finished region 14 is preferably provided with arithmetic average roughness Ra of less than 0.01 µm and more preferably less than 0.005 µm.

Herein, arithmetic average roughness Ra and mean length of a roughness curve element RSm are roughness parameters defined in JIS B 0601:2001. In this invention, measurement of these parameters is conducted by use of a measurement apparatus having a spatial resolution of not larger than 0.1 µm. General roughness meters of a stylus type are not preferred because the curvature radius of the stylus top is as large as more than few µm.

Roughened surface region 13 may have a small area provided that it contains at least the central portion of molding surface 15. In view of effectively restraining generation of an air pool even when the colliding position of molten glass droplet 20 may fluctuate slightly, the boundary between roughened surface region 13 and mirror finished region 14 is preferably out of the circle making the center of molding surface 15 as the center and having a diameter of 0.1 mm and more preferably out of the circle having a diameter of 0.5 mm.

Further, in the case of molding surface being a concave surface, breakage of cover layer 12 is easily caused since the load at the time of press-molding is particularly large in a region where angle θ of molding surface against the horizontal surface (refer to FIG. 1 (*b*)) is not less than 30°. Therefore, when molding surface 15 is provided with a concave surface having the maximum value of the angle against the horizontal surface of not less than 30°, a region among molding surface 15 where the angle against the horizontal surface is not less than 30° is preferably mirror finished region 14. Thereby, it is possible to effectively restrain breakage of the peripheral portion due to strength decrease.

A method to form cover layer 12 having roughened surface region 13 and mirror finished region 14 includes such as (A) a method to form cover layer 12 on base material 11 which has been subjected to a precision processing and to provided cover layer 12 formed with a roughening treatment to increase arithmetic average roughness Ra and (B) a method in which a predetermined region of base material 11 is provided with cover layer 12 after having been subjected to a roughening treatment to increase arithmetic average roughness Ra.

In the case of forming cover layer 12 having roughened surface region 13 and mirror finished region 14 by above-described method (A), there are advantages that selection of a material for base material 11 in consideration of easiness of roughening is not necessary since base material 11 is not required to be roughened and that uniform roughness can be easily formed by appropriately selection of a material for cover layer 12. In this case, a material for cover layer 12 is preferably contains at least one of metal elements in a group comprising aluminum, titanium and chromium, at least one kind of oxides of said metal elements (aluminum oxide, titanium oxide or chromium oxide), or at least one kind of nitrides of said metal elements (chromium nitride, aluminum nitride or titanium nitride) as a primary component. Film comprising these materials as a primary component has merits to hardly react even when being brought in contact with a high temperature molten glass droplet as well as to be easily roughened by etching. The film thickness of cover layer 12 may be as thick as to be subjected to a roughening treatment and is generally preferably not less than 0.05 µm. On the other hand, when the film thickness of cover layer 12 is excessively large, there may be a case of easy generation of defects such as film peeling. Therefore, the film thickness of cover layer 12 is preferably 0.5-10 µm and more preferably 1-5 µm. A deposition method of cover layer 12 is not limited and may be selected among methods well known in the art. For example, listed are such as vacuum evaporation, spattering and CVD.

There is no specific limitation to a method for roughening to increase arithmetic average roughness Ra of the surface of cover layer 12, and wet etching utilizing an etching solution and dry etching utilizing an etching gas are preferred in view of uniformly forming predetermined roughness. In particular, wet etching can be preferably utilized since it requires no costly facility and can easily form uniform roughness. Wet etching is a method to bring a reactive etching solution in contact with the surface of cover layer 12 to react and to form roughness. Cover layer 12 may be immersed in an etching solution stored or a predetermined amount of an etching solution may be supplied on cover layer 12. Further, a method to spray an etching solution may be adopted.

An etching solution may be appropriately selected among etching solutions suitable for the material of cover layer 12. In the case of cover layer 12 being made of aluminum, for example, various acidic solutions are preferable. In the case of cover layer 12 being made of titanium, for example, etching solutions containing reductive acid such as hydrochloric acid and sulfuric acid as a primary component are preferable. Further, in the case of cover layer 12 being made of chromium, for example, utilized can be an acidic solution containing ammonium cerium nitrate and a basic solution containing potassium ferricyanide and potassium hydroxide.

To roughen a predetermined region (a region to be roughened surface region 13) among cover layer 12 by etching, utilized may be a mask member which is constituted so as to make only the predetermined region contact with an etching solution (or an etching gas) at the time of etching. Further, as another method, also preferable is a method in which film deposition is performed so as to make the etching rate in the predetermined region of cover layer 12 higher than that in the peripheral portion. FIG. 3 is a drawing to schematically show an example of a method for deposition of cover layer 12 in which an etching rate in the central portion is higher than in the peripheral portion. FIG. 3 (a) shows the first embodiment and FIG. 3 (b) shows the second embodiment, respectively.

The first embodiment shown in FIG. 3 (a) is a method to perform deposition by arranging mask 32 having a predetermined size between spattering target 31 and molding surface 15 which is a deposition surface. In a spattering method, the etching rate becomes small when the energy with which spattered particles are provided is the larger and the etching rate becomes large when the energy with which spattering particles are provided is the smaller. In the case of this embodiment, since the central portion of molding surface 15 is shaded by mask plate 32, only spattered particles 35 which rounded outside of mask plate 32 having small energy will reach. Therefore, the etching rate in the central portion of cover layer 12 is not smaller than the etching rate of the peripheral portion, and it is possible to form roughened surface region 13 and mirror finished region 14 on the surface of cover layer 12 by providing the whole surface of cover layer 12 with etching.

The second embodiment shown in FIG. 3 (b) is a method for deposition of film while base material 11 being arranged over spattering target 31 with molding surface 15 being inclined against the horizontal plane and being rotated around rotation axis 33 which is inclined against the perpendicular direction. Also in this case, spattered particles 31 flying from spattering target 31 directly arrive in the peripheral portion of molding surface 15, while only spattered particles 35 which collided with spattering gas to turned around and have smaller energy reach the central portion of molding surface 15. Therefore, the etching rate in the central portion of cover layer 12 is not smaller than the etching rate of the peripheral portion, and it is possible to form roughened surface region 13 and mirror finished region 14 on the surface of cover layer 12 by providing the whole surface of cover layer 12 with etching.

In this manner, a method in which film deposition is performed so as to make the etching rate in the predetermined region of cover layer 12 higher than that in the peripheral region and etching of the whole surface is performed has a merit of not requiring a mask member at the time of etching and enabling etching by a simple method. Further, according to the first embodiment and the second embodiment which were described above, since the etching rate of deposited cover layer 12 will continuously vary at the boundary portion, arithmetic average roughness Ra continuously varies at the boundary portion between roughened surface region 13 and mirror finished region 14. Therefore, it is possible to restrain breakage of cover layer 12 at the boundary portion between roughened surface region 13 and mirror finished region 14 to prepare a mold having higher durability.

On the other hand in the case of forming cover layer 12 having roughened surface region 13 and mirror finished region 14 by above-described method (B), since cover layer 12 is not required to be roughened there is a merit of enabling suitable selection of the material for cover layer 12 in view of reactivity with molten glass without considering roughening easiness. In this case, the material for cover layer 12 preferably contains at least one of metal elements in a group comprising aluminum, titanium and chromium, at least one kind of oxides of said metal elements (aluminum oxide, titanium oxide or chromium oxide) or at least one kind of nitrides of said metal elements (chromium nitride, aluminum nitride or titanium nitride) as a primary component. Further, cover layer 12 is also preferably comprised of at least one metal among a group comprising ruthenium, rhodium, palladium, silver, tungsten, osmium, iridium and platinum as a primary component. Film comprising these materials as a primary component has an advantage of being very stable to hardly react even in contact with high temperature molten glass. The film thickness of cover layer 12 may be as thick as not to expose the surface of base material 11 and is generally preferably not less than 0.01 μm. On the other hand, when the film thickness of cover layer 12 is excessively large, there may be a case to easily generate defects such as film peeling. Therefore, the film thickness of cover layer 12 is preferably 0.01-10 μm and more preferably 0.1-2 μm.

Herein, in this embodiment, an example of cover layer being constituted of only one layer was explained; however, cover layer 12 may be provided with a multi-layer construction comprising not less than two layers. For example, an intermediate layer may be arranged to enhance adhesion of base material 11 and cover layer 12, or a protective layer provided with roughness by a roughening treatment may be arranged on cover layer 12 to protect the surface. In the case of cover layer 12 being constituted of not less than two layers, predetermined roughened surface region 13 and mirror finished region 14 may be formed on the outermost surface which contacts with molten glass droplet 20.

(Manufacturing Method of Glass Molded Bodies)

Figure 5:
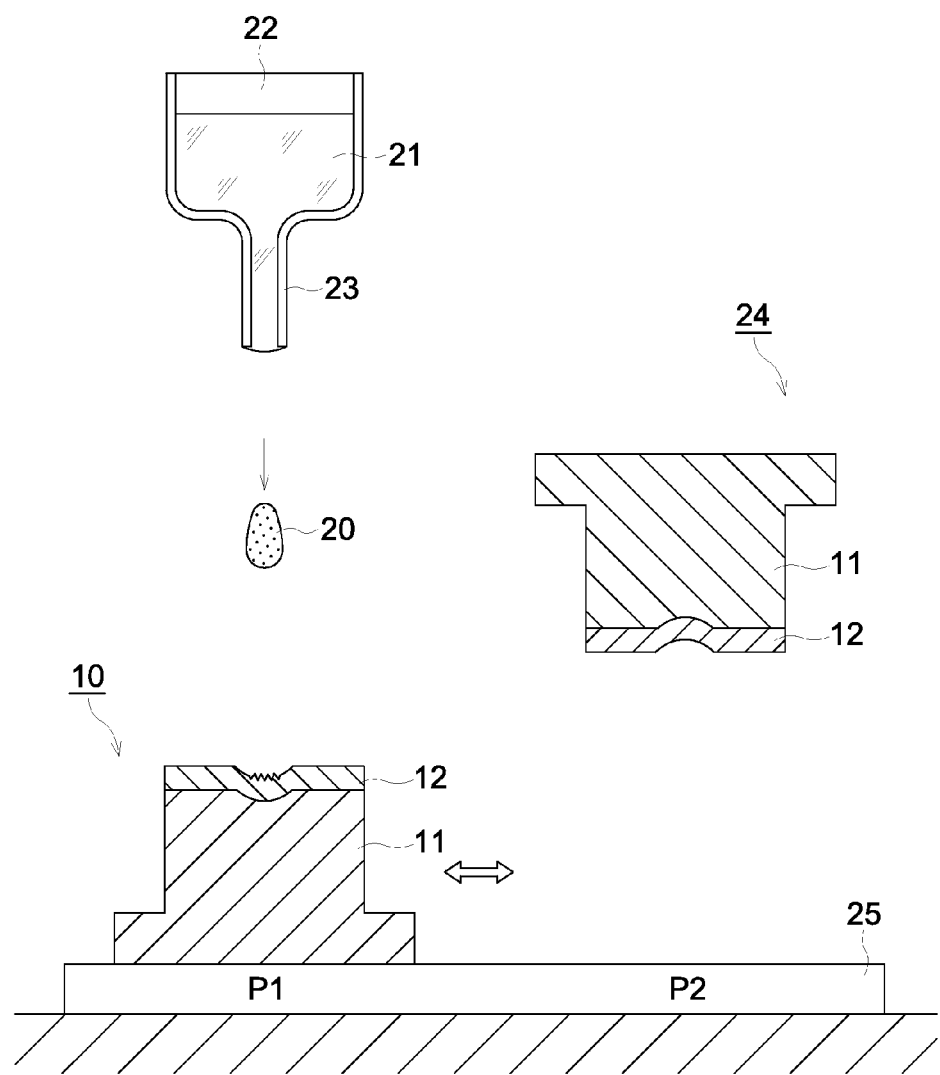
FIG. 5 is a schematic drawing to show an example of an apparatus for manufacturing glass molded bodies which is utilized in this embodiment (a state in process S203).
Figure 6:
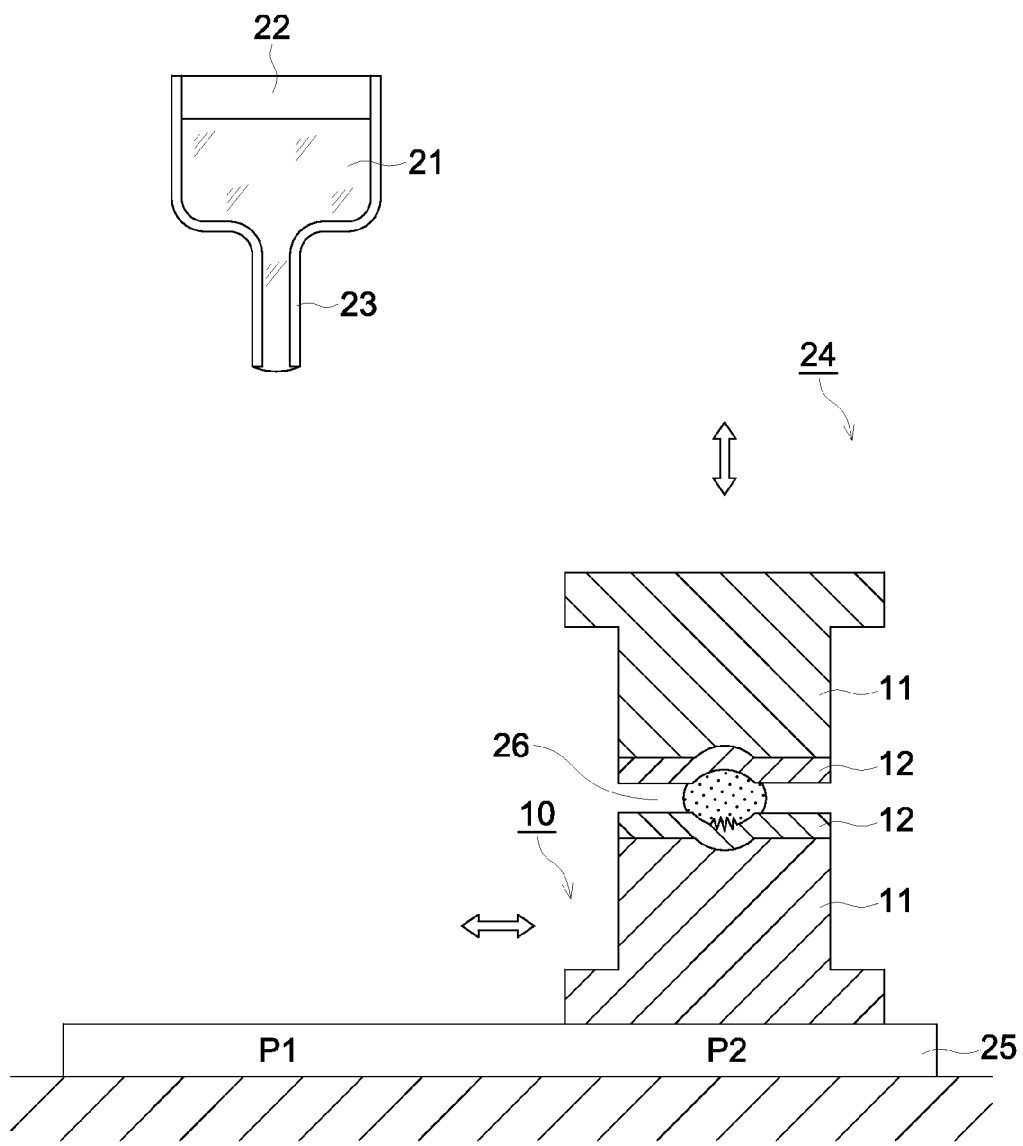
FIG. 6 is a schematic drawing to show an example of an apparatus for manufacturing glass molded bodies which is utilized in this embodiment (a state in process S205).

Next, a method for manufacturing glass molded bodies of this embodiment will be explained in reference to FIGS. 4-6. FIG. 4 is a flow chart to show an example of a method for manufacturing glass molded bodies. Further, FIG. 5 and FIG. 6 are schematic drawings to show a manufacturing apparatus of glass molded bodies utilized in this embodiment. FIG. 5 shows the state in a process (S 203) to drip a molten glass droplet on under mold, and FIG. 6 shows the state in a process (S 205) to perform press-molding of the dropped molten glass droplet with an under mold and an upper mold, respectively.

The manufacturing apparatus of glass molded bodies shown in FIGS. 5 and 6 is equipped with melting bath 22 to store molten glass 21, dripping nozzle 23 which is connected to the bottom of melting bath 22 to drip molten glass droplet 20, under mold 10 to receive molten glass droplet 20 dropped and upper mold 24 to conduct press-molding of molten glass droplet 20 in conjunction with under mold 10. Under mold 10 is above-described mold 10, and are labeled with same symbols and the detailed explanation will be omitted here. Further, as for upper mold 24, one in which cover layer 12 is formed on base material 11 to prevent fusing is utilized here; however, it is not limited thereto.

Under mold 10 and upper mold 24 are constituted to be heated at a predetermined temperature with a heating means which is not shown in the drawing. A heating means can be utilized by appropriate selection among heating means well known in the art. For example, such as a cartridge heater which is used by being berried inside, a heater of a sheet form utilized by being brought in contact with the outside, an infrared heater and a high frequency induction heater can be utilized. Preferable is a constitution enabling independent temperature control of under mold 10 and upper mold 24 separately. Under mold 10 is constituted to be shiftable by a drive means, which is not shown in the drawing, along guide 25 between a position (dripping position P1) to receive molten glass droplet 20 and a position (press-molding position P2) to conduct press-molding opposing to upper mold 24. Further, upper mold 24 is constituted to be shiftable by a drive means, which is not shown in the drawing, in the direction (the vertical direction in the drawing) to compress molten glass droplet 20.

In the following, according to the flow chart shown in FIG. 4, each process of a method for manufacturing glass molded bodies will be explained in order.

First, under mold 10 and upper mold 24 are heated at a predetermined temperature (process S201). A predetermined temperature may be set to a temperature by appropriate selection to provide a glass molded body with a good transfer surface by press-molding. The heating temperatures of under mold 10 and upper mold 24 may be same with or different from each other. Practically, since the suitable temperature will differ depending on various conditions such as a kind of glass, the shape and size of a glass molded body to be manufactured, and the material and size of under mold 10 and upper mold 24, it is preferable to experimentally determine the suitable temperature. Generally, the temperature is preferably set to from Tg−100° C. to Tg+100° C., when the transition temperature of glass utilized is Tg.

Next, under mold 10 is shifted to dripping position P1 (process S203), and molten glass droplet 20 is dropped through dripping nozzle 23 (process S203) (confer to FIG. 5). Dripping of molten glass droplet 20 is performed by heating dripping nozzle 23 connected to melting bath 22 which stores molten glass 21 at a predetermined temperature. When dripping nozzle is heated at a predetermined temperature, molten glass 21 stored in melting bath 22 is supplied to the top portion of dripping nozzle 23 by self weight and stays in a liquid droplet form due to surface tension. When the molten glass staying in the top portion of dripping nozzle becomes a certain mass, the molten glass is naturally separated from dripping nozzle 23 due to gravity to be dropped as molten glass droplet 20.

The mass of molten glass droplet 20 dropped through dripping nozzle 23 can be adjusted by such as the outer diameter of the top portion of dripping nozzle 23, and approximately 1-2 g of glass droplet 20 can be dropped although it depends on a kind of glass. Further, it is also possible that molten glass droplet 20 dropped through dripping nozzle 23 is once made to collide against a member having penetrating micro pores and a part of the molten glass droplet having collided is made to pass through the penetrating micro pores to be micronized and the micronized molten glass droplets are dropped on under mold 10. By utilizing such a method, it is possible to manufacture a more minute glass molded body compared to the case of receiving molten glass droplet 20 dropped through dripping nozzle 23 as it is. Herein, the interval of dripping molten glass droplet 20 through dripping nozzle can be finely adjusted by such as the inner diameter, length and heating temperature of dripping nozzle 23

The kind of glass utilizable is not specifically limited and glass well know in the art can be utilized by appropriate selection. For example, listed are optical glass such as borosilicate glass, silicate glass, phosphate glass and lanthanum type glass.

Next, under mold 10 is shifted to press-molding position P2 (process S204) and under mold 24 is shifted downward to conduct press-molding of molten glass droplet 20 with under mold 10 and upper mold 24 (process S205) (confer to FIG. 6). Molten glass droplet 20 received by under mold 10 is cooled by heat emission through a contact surface with under mold 10 or upper mold 24 while being subjected to press-molding and is solidified to be glass molded body 26. When glass molded body 26 is cooled to a predetermined temperature, upper mold 24 is shifted upward to release pressure. It is generally preferable to release pressure after glass molded body 26 is cooled to a temperature near to Tg of glass although it depends on a kind of glass; and the size, shape and required precision of glass molded body 26.

The load to compress molten glass droplet 20 may be constant always or may be varied depending on time. The magnitude of the load may be appropriately set depending on such as the size of glass molded body 26 to be manufactured. Further, the drive means to shift upper mold 24 up and down is not specifically limited and drive means well known in the art such as an air cylinder, an oil cylinder, an electric cylinder using a servomotor can be utilized by appropriate selection.

Thereafter, upper mold 24 is shifted upward to be sheltered and glass molded body 26 solidified is recovered (process S206) to complete manufacturing of glass molded body 26. Then, in the case of continuing manufacture of glass molded body 26, under mold 10 is shifted again to dripping position P1 (process S202) and the following processes may be repeated. Herein, a method for manufacturing glass molded bodies of this embodiment may include processes other than those explained here. For example, a process to inspect the shape of glass molded body 26 before recovering glass molded body 26 or a process to clean under mold 10 and upper mold 24 after recovering glass molded body 26 may be provided.

Under mold 10 (mold 10) utilized in this embodiment can restrain generation of fusing with molten glass because cover layer 12 is formed on molding surface 15. Further, since roughened surface region 13 is formed at the central position of molding surface 15, it is possible to restrain generation of an air pool on glass molded body 26. Further, the peripheral portion which receives maximum load at the time of press-molding is provided with mirror finished region 14 having arithmetic average roughness Ra smaller than that of roughened surface region 13. It is possible to restrain breakage due to strength decrease of the peripheral portion because the strength of cover layer 12 is higher in mirror finished region 14 than in roughened surface region 13.

Glass molded body 26 manufactured by a manufacturing method of this embodiment can be utilized as various optical elements such as a pickup lens for a digital camera, an optical pickup lens for a DVD and a coupling lens for optical communication. Further, it can be utilized as a glass preform for manufacturing various optical elements by a method for manufacturing an optical element by press-molding of a glass preform together with a mold (a reheat press method).

EXAMPLES

In the following, examples which have been performed to confirm the effects of this invention will be explained; however, this invention is not limited thereto.

Experiment 1

Preparation of Mold

Cover layer 12 is formed on base material 11 and a mold having a shape shown in FIG. 1 was prepared by a method in which the predetermined region of cover layer 12 formed was subjected to a roughening treatment to increase arithmetic average roughness Ra. The material of base material 11 was a sintered substance of a carbon silicate (SiC), a curvature radius of concave surface was 5 mm, diameter of φa of molding surface 15 was 10 mm, and diameter φb of concave surface was 7.1 mm. The maximum value of the angle of molding surface 15 against the horizontal plane was 45°.

On base material 11, cover layer 12 comprising chromium was deposited by a method shown in FIG. 3 (*a*), and the whole surface of cover layer 12 was roughened by being brought in contact with an etching solution. By changing the size of mask plate 32 utilized at the time of deposition, the size of roughened surface region 13 was adjusted (examples 1-4). Further, as comparative examples, prepared were a mold (comparative example 1) in which cover layer 12 was deposited without using mask plate 32 and not provided with etching, and a mold (comparative example 2) in which cover layer 12 was deposited without using mask plate 32 and the whole surface was roughened by long time etching. As an etching solution, utilized was chromium etching solution (ECR-2, manufactured by Nacalai Tesque, Inc.) containing ammonium cerium nitrate and available on the market. Roughening was conducted so as to make arithmetic average roughness Ra of roughened surface region 13 of 0.1 μm. At this time, mean length of a roughness curve element RSm of roughened surface region 13 was 0.1 μm. Further arithmetic average roughness Ra of mirror finished region 14 was 0.005 μm. Herein, arithmetic average roughness Ra and mean length of a roughness curve element RSm were measured by an AFM (D3100, manufactured by Digital Instruments). Positions of the boundary between roughened surface region 13 and mirror finished region 14 and the angle against the horizontal plane at said boundary will be shown in table 1.

TABLE 1

|  | Position of boundary (diameter) (mm) | Angle against horizontal plane (°) | Air pools at 2,000 pieces production | Air pools at 4,000 pieces production | Air pools at 6,000 pieces production | Peeling of cover layer at 2000 pieces production | Peeling of cover layer at 4,000 pieces production | Peeling of cover layer at 6,000 pieces production |
|---|---|---|---|---|---|---|---|---|
| Example 1 | φ0.1 | 1 | good | good | good | good | good | good |
| Example 2 | φ2.6 | 15 | good | good | good | good | good | good |
| Example 3 | φ5.0 | 30 | good | good | good | good | good | good |
| Example 4 | φ5.7 | 35 | good | good | good | good | good | poor |
| Comparative example 1 | the whole surface is a mirror polished region | — | poor | poor | poor | good | good | good |
| Comparative example 2 | the whole surface is a roughened surface region | — | good | good | good | poor | poor | poor |

(Manufacturing of Glass Molded Body)

Manufacturing of glass molded bodies was performed according to the flow chart shown in FIG. 4 by use of 6 kinds of molds prepared in the above manner as under mold 10. As a glass material, phosphate type glass having Tg of 480° C. was utilized. The temperature in the neighborhood of the top of dripping nozzle 23 was set to 1,000° C. so that approximately 190 mg of molten glass droplet 20 will drip. Further, the heating temperature in process S301 was set to 500° C. for under mold 10 and 450° C. for upper mold 24. The load at the time of compression in process S305 was 1,800 N. Herein, as for upper mold 24, one in which the molding surface was flat and cover layer 12 was formed under the condition same with comparative example 1 was utilized.

By use of 6 kinds of molds, each 6,000 pieces of glass molded bodies were prepared. At every 2,000 pieces production, molds and glass molded bodies prepared were observed to evaluate generation of an air pool and generation of peeling in cover layer 12. The evaluation results will be also shown in table 1. As for generation of an air pool, the case of no air pools being observed was described as good and the case of an air pool being observed was described as poor. Further, as for generation of peeling in cover layer 12, the case of no peeling being observed was described as good and the case of peeling being observed was described as poor. Herein, generation of fusing was also evaluated similarly; however, generation of fusing was not observed with any mold.

As shown in table 1, in the case of comparative example 1, since central portion 16 of molding surface 15 is not provided with roughened surface region 13, generation of an air pool was observed in glass molded bodies at every stage. Further, in the case of comparative example 2, since the peripheral portion in molding surface 15 is not provided with mirror finished region 14, peeling of cover layer 12 was already observed at 2,000 pieces production of glass molded bodies. On the contrary, in examples 1-4, neither generation of an air pool nor generation of peeling of cover layer 12 were observed at 4,000 pieces production of glass molded bodies, and the effect of this invention has been confirmed. Among them, as for examples 1-3, generation of any defect was observed even at 6,000 pieces production of glass molded bodies, and it has been confirmed that a specifically high effect is achieved.

Experiment 2

6 kinds of under mold (examples 5-10) having different surface roughness degrees (arithmetic average roughness Ra and mean length of a roughness curve element RSm) of roughened surface region 13 were prepared under the conditions same with the under mold of above-described example 2, and manufacturing of glass molded bodies was performed in a similar manner to experiment 1. Arithmetic average roughness Ra and mean length of a roughness curve element RSm of roughened surface region 13 of under molds prepared will be shown in table 2. Such as the shape and size other than the surface roughness degree of roughness surface region 13 were same with those of under mold of example 2, arithmetic average roughness Ra of mirror polished surface region 14 was set to 0.005 μm, and the boundary between roughness surface region 13 and mirror finished region 14 was set at the position of diameter φ 2.6 mm.

Each 2,000 pieces of glass molded bodies were prepared by use of each under mold, and glass molded bodies prepared were observed to evaluate the generation and size of an air pool. Further, same experiment with the under mold of comparative example 1, in which the whole molding surface 15 was mirror finished region 14 (arithmetic average roughness Ra=0.005 μm), was performed. The evaluation results will be also shown in table 2.

TABLE 2

|  | Roughened surface region | | Air pools: |
| --- | --- | --- | --- |
|  | Ra(μm) | RSm(μm) | (μm) |
| Comparative example 1 | 0.005 (the whole surface is a mirror finished region) | | 100 |
| Example 5 | 0.009 | 0.02 | 10 |
| Example 6 | 0.01 | 0.03 | none |
| Example 7 | 0.1 | 0.1 | none |
| Example 8 | 0.3 | 0.3 | none |
| Example 9 | 0.5 | 0.5 | none |
| Example 10 | 0.6 | 0.6 | 10 |

As shown in table 2, in the case of under molds of examples 5-10 having roughened surface region 13 at central portion 16 of molding surface 15, it is confirmed that the size of an air pool is remarkably small compared to the case of comparative example 1. Among them, in the case of examples 5-9 in which arithmetic average roughness Ra is not less than 0.01 μm and not more than 0.5 μm and mean length of a roughness curve element RSm is not more than 0.5 μm, it has been confirmed that no generation of an air pool is observed to show an especially excellent effect.

Experiment 3

Under the condition same with that of an under mold of above described example 2, 4 kinds of under molds (examples 11-14) each having different arithmetic average roughness Ra of mirror finished region 14 were prepared, and manufacturing of glass molded bodies was performed in a similar manner to experiment 1. Arithmetic average roughness Ra of mirror finished region 14 of under molds prepared will be shown in table 3. Such as the shape and size other than arithmetic average roughness Ra of mirror finished region 14 were same with those of an under mold of example 2, arithmetic average roughness Ra of roughness surface region 13 was set to 0.1 μm, mean length of roughness curve element RSm was set to 0.1 μm, and the boundary between roughness surface region 13 and mirror finished region 14 was set at the position of diameter φ 2.6 mm.

By use of 6 kinds of molds, each 6,000 pieces of glass molded bodies were prepared, and at every 2,000 pieces production, the molds and glass molded bodies prepared were observed to evaluate generation of peeling of cover layer 12 in mirror finished region 14. Further, a same experiment was performed with an under mold of comparative example 2 in which the whole surface was roughened surface region 13 (arithmetic average roughness Ra=0.1 μm). The evaluation results will be also shown in table 3. Herein, the case of no peeling of cover layer 12 being observed was described as good, and the case of peeling of cover layer 12 being observed was described as poor.

TABLE 3

|  | Mirror finished region Ra(μm) | Peeling of cover layer (μm) | | |
| --- | --- | --- | --- | --- |
|  |  | at 2,000 pieces production | at 4,000 pieces production | at 6,000 pieces production |
| Example 11 | 0.005 | good | good | good |
| Example 12 | 0.009 | good | good | good |
| Example 13 | 0.01 | good | good | poor |
| Example 14 | 0.05 | good | good | poor |
| Comparative example 2 | 0.1 (the whole surface is a roughened surface region) | poor | poor | poor |

As shown in table 3, while peeling of cover layer 12 was already generated at 2,000 pieces production of glass molded bodies in the case of comparative example 2, in the case of under molds of examples 11-14 which are provided with mirror finished region 14 outside roughened surface region 13, it has been confirmed that there generated no peeling even at 4,000 pieces production of glass molded bodies. Among them, in the case of under molds of examples 11 and 12 which is provided with arithmetic average roughness Ra of mirror finished region 14 of less than 0.01 μm, no generation of cover layer 12 was observed even at 6,000 pieces production of glass molded bodies to confirm an specifically excellent effect.

DESCRIPTION OF THE SYMBOLS 10 mold (under mold)
11 base material
12 cover layer
13 roughened surface region
14 mirror finished region
15 molding surface
16 center portion
20 molten glass droplet
21 molten glass
22 melting bath
23 dripping nozzle
24 upper mold
25 guide
26 glass molded body
27 concave portion
31 spattering target
32 mask plate
33 rotation axis

The invention claimed is:
1. A mold which is utilized as an under mold for manufacturing a glass molded body by receiving a dropped molten glass droplet and by press-molding the molten glass droplet in conjunction with an upper mold, the mold comprising:

- a base material having a non-planar molding surface to press-mold the molten glass droplet;
- a cover layer formed on the non-planar molding surface; and
- a surface of the cover layer formed on the non-planar molding surface having a roughened surface region in a center portion of the non-planar molding surface, and a mirror finished region in the non-planar molding surface and surrounding an outside of the roughened surface region, the mirror surface having an arithmetic average roughness Ra of not more than that of the roughened surface region.

2. The mold described in claim 1, wherein the surface of the cover layer in the roughened surface region has arithmetic average roughness Ra of 0.01-0.5 μm and mean length of a roughness curve element RSm of not more than 0.5 μm, and wherein the surface of the cover layer in the mirror finished region has arithmetic average roughness Ra of less than 0.01 μm.

3. The mold described in claim 1 or 2, wherein the roughened surface region of the cover layer is formed on a roughened surface region of the base material corresponding to the roughened surface of the cover layer.

4. The mold described in claim 3, wherein the cover layer contains at least one kind of metal elements in a group comprising aluminum, titanium and chromium, at least one kind of oxides of the metal elements or at least one kind of nitrides of the metal elements, as a primary component.

5. The mold described in claim 3, wherein the cover layer contains at least one kind of metals in a group comprising ruthenium, rhodium, palladium, silver, tungsten, osmium, iridium and platinum, as a primary component.

6. The mold described in claim 3, wherein a film thickness of the cover layer is not less than 0.01 μm and not more than 10 μm.

7. The mold described in claim 1, wherein the roughened surface region of the cover layer is formed on a non-roughened surface of the base material.

8. The mold described in claim 7, wherein the cover layer contains at least one kind of metal elements in a group comprising aluminum, titanium and chromium, at least one kind of oxides of the metal elements or at least one kind of nitrides of the metal elements, as a primary component.

9. The mold described in claim 7, wherein a film thickness of the cover layer is not less than 0.5 μm and not more than 10 μm.

10. The mold described in claim 1, wherein arithmetic average roughness Ra continuously varies at a boundary portion between the roughened surface region and the mirror finished region.

11. The mold described in claim 1, wherein a boundary between the roughened region and the mirror finished region is outside of a circle provided with the center portion of the non-planar molding surface as a center and a diameter of 0.1 mm.

12. The mold described in claim 1, wherein the non-planar molding surface has a concave surface having a maximum angle against a horizontal surface of not less than 30° and a region having an angle against the horizontal surface of not less than 30° within the non-planar molding surface is the mirror finished region.

13. A method for manufacturing a glass molded body comprising: dropping a molten glass droplet on an under mold; and press-molding the molten glass droplet dropped on the under mold by use of the under mold and an upper mold opposing to the under mold, the under mold comprising:

- a base material having a non-planar molding surface to press-mold the molten glass droplet;
- a cover layer formed on the non-planar molding surface; and
- a surface of the cover layer formed on the non-planar molding surface having a roughened surface region in a center portion of the non-planar molding surface, and a mirror finished region in the non-planar molding surface and surrounding an outside of the roughened surface region, the mirror surface having an arithmetic average roughness Ra of not more than that of the roughened surface region.

14. The meld described in claim 1, wherein the non-planar molding surface is a concave surface.

* * * * *